(12) United States Patent
Chang et al.

(10) Patent No.: US 9,118,140 B2
(45) Date of Patent: Aug. 25, 2015

(54) CHIP CARD HOLDER WITH PROTECTIVE COVER FOR PORTABLE ELECTRONIC DEVICES

(71) Applicant: Chi Mei Communication Systems, Inc., New Taipei (TW)

(72) Inventors: Ming-Shiung Chang, New Taipei (TW); Chih-Lung Lin, New Taipei (TW); Kuo-Heng Sun, New Taipei (TW); Xin-Yi Li, New Taipei (TW); Chao-Kun Tseng, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 116 days.

(21) Appl. No.: 13/753,960

(22) Filed: Jan. 30, 2013

(65) Prior Publication Data

US 2013/0237086 A1     Sep. 12, 2013

(30) Foreign Application Priority Data

Mar. 8, 2012   (CN) .......................... 2012 1 0059720

(51) Int. Cl.
*H01R 13/46* (2006.01)
*G06K 19/00* (2006.01)

(52) U.S. Cl.
CPC .............. *H01R 13/46* (2013.01); *G06K 19/005* (2013.01)

(58) Field of Classification Search
CPC .... H01R 13/46; H01R 13/52; H01R 2201/06; G06K 19/005; G06K 13/0862; H04B 1/3816
See application file for complete search history.

(56) References Cited

U.S. PATENT DOCUMENTS

| | | | | |
|---|---|---|---|---|
| 4,891,013 A | * | 1/1990 | Komaki | 439/66 |
| 5,752,757 A | * | 5/1998 | Choi | 312/319.1 |
| 5,826,176 A | * | 10/1998 | Choi | 455/351 |
| 5,933,328 A | * | 8/1999 | Wallace et al. | 361/737 |
| 5,957,718 A | * | 9/1999 | Cheng et al. | 439/347 |
| 6,065,680 A | * | 5/2000 | Choi | 235/475 |
| 6,101,372 A | * | 8/2000 | Kubo | 455/558 |
| 6,149,466 A | * | 11/2000 | Bricaud et al. | 439/630 |
| 6,304,454 B1 | * | 10/2001 | Akamatsu et al. | 361/752 |
| 6,422,469 B1 | * | 7/2002 | Pernet | 235/486 |
| 6,450,408 B2 | * | 9/2002 | Shiue | 235/492 |
| 6,705,529 B1 | * | 3/2004 | Kettunen et al. | 235/486 |
| 6,863,445 B2 | * | 3/2005 | Ngo | 385/55 |
| 6,923,373 B2 | * | 8/2005 | Kanagawa et al. | 235/451 |
| 6,928,302 B1 | * | 8/2005 | Kinney et al. | 455/558 |
| 6,959,864 B2 | * | 11/2005 | Buschmann | 235/451 |
| 7,125,258 B2 | * | 10/2006 | Nakakubo et al. | 439/64 |

(Continued)

FOREIGN PATENT DOCUMENTS

| CN | 2624538 Y | 7/2004 |
|---|---|---|
| CN | 101848251 A | 9/2010 |

(Continued)

*Primary Examiner* — Adrian S Wilson
*Assistant Examiner* — Izak Baranowski
(74) *Attorney, Agent, or Firm* — Novak Druce Connolly Bove + Quigg LLP

(57) ABSTRACT

A chip card holder includes a housing, a printed circuit board, a seat, a pivotable shaft, a protective cover, a receiving frame, and a tray. The housing defines an opening. The seat is slidably received in the housing. The protective cover is rotatably connected to the seat with the pivotable shaft configured for covering the opening. The receiving frame is mounted on the printed circuit board. The tray is positioned on the seat, and is slidably received in the receiving frame.

13 Claims, 7 Drawing Sheets

(56) References Cited

U.S. PATENT DOCUMENTS

| | | | |
|---|---|---|---|
| 7,321,783 B2 * | 1/2008 | Kim .................. 455/556.1 |
| 7,409,225 B2 * | 8/2008 | Kim et al. ............. 455/558 |
| 7,686,654 B2 * | 3/2010 | Hubert et al. ........... 439/638 |
| 7,713,091 B2 * | 5/2010 | Chen ................. 439/630 |
| 7,744,000 B2 * | 6/2010 | Yang et al. ............ 235/486 |
| 7,746,635 B2 * | 6/2010 | Lu ................ 361/679.55 |
| 7,762,851 B2 * | 7/2010 | Li ................... 439/630 |
| 7,780,477 B2 * | 8/2010 | Hubert et al. ........... 439/638 |
| 7,823,790 B1 * | 11/2010 | Valenzuela et al. ........ 235/486 |
| 8,150,466 B2 * | 4/2012 | Park et al. ............. 455/558 |
| 8,355,260 B2 * | 1/2013 | Kang .................. 361/752 |
| 8,371,878 B2 * | 2/2013 | Tang .................. 439/630 |
| 8,430,256 B2 * | 4/2013 | Allore et al. ............ 220/4.02 |
| 8,462,512 B2 * | 6/2013 | Zhang ................. 361/737 |
| 8,464,959 B2 * | 6/2013 | Jin et al. .............. 235/492 |
| 8,737,088 B2 * | 5/2014 | Chang ................. 361/810 |
| 2002/0058432 A1 * | 5/2002 | Chen et al. ............. 439/142 |
| 2008/0160803 A1 * | 7/2008 | Morganstern et al. ...... 439/131 |
| 2012/0162925 A1 * | 6/2012 | Luo et al. ............. 361/727 |
| 2013/0115796 A1 * | 5/2013 | Liu et al. ............. 439/325 |
| 2014/0002971 A1 * | 1/2014 | CHUNG et al. ....... 361/679.01 |

FOREIGN PATENT DOCUMENTS

| | | |
|---|---|---|
| TW | I327394 | 7/2010 |
| TW | M418443 | 12/2011 |
| TW | M438099 U1 | 9/2012 |

* cited by examiner

CHIP CARD HOLDER WITH PROTECTIVE COVER FOR PORTABLE ELECTRONIC DEVICES

BACKGROUND

1. Technical Field

The present disclosure relates to chip card holders, and particularly to a chip card holder with a protective structure for portable electronic devices.

2. Description of Related Art

With the development of wireless communication and information processing technologies, portable electronic devices such as mobile phones are now widely used. Surface contact cards are necessary elements in portable electronic devices.

One portion of conventional chip card holders are directly exposed from housings of the portable electronic device. The exposed portion defines a hole for convenient insertion and removal of the surface contact card with a tool. However, the hole on the portable electronic device affects the appearance. In addition, dust or water might penetrate through clearances between the exposed portion and the housing of the portable electronic device.

Therefore, there is room for improvement within the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the exemplary chip card holder and portable electronic device using the chip card holders. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
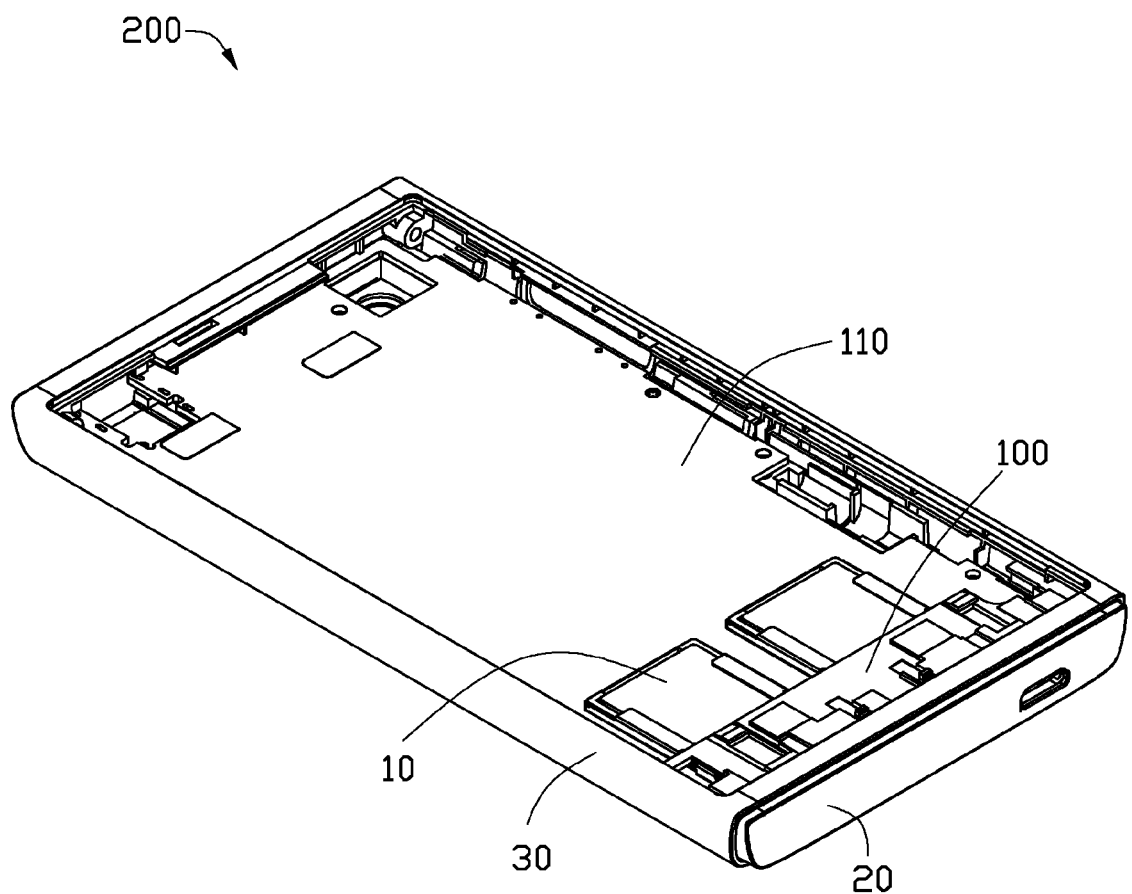
FIG. 1 is a schematic view of one embodiment of a portable electronic device, the portable electronic device including a housing, a PCB, two chip cards, and a chip card holder.
Figure 2:
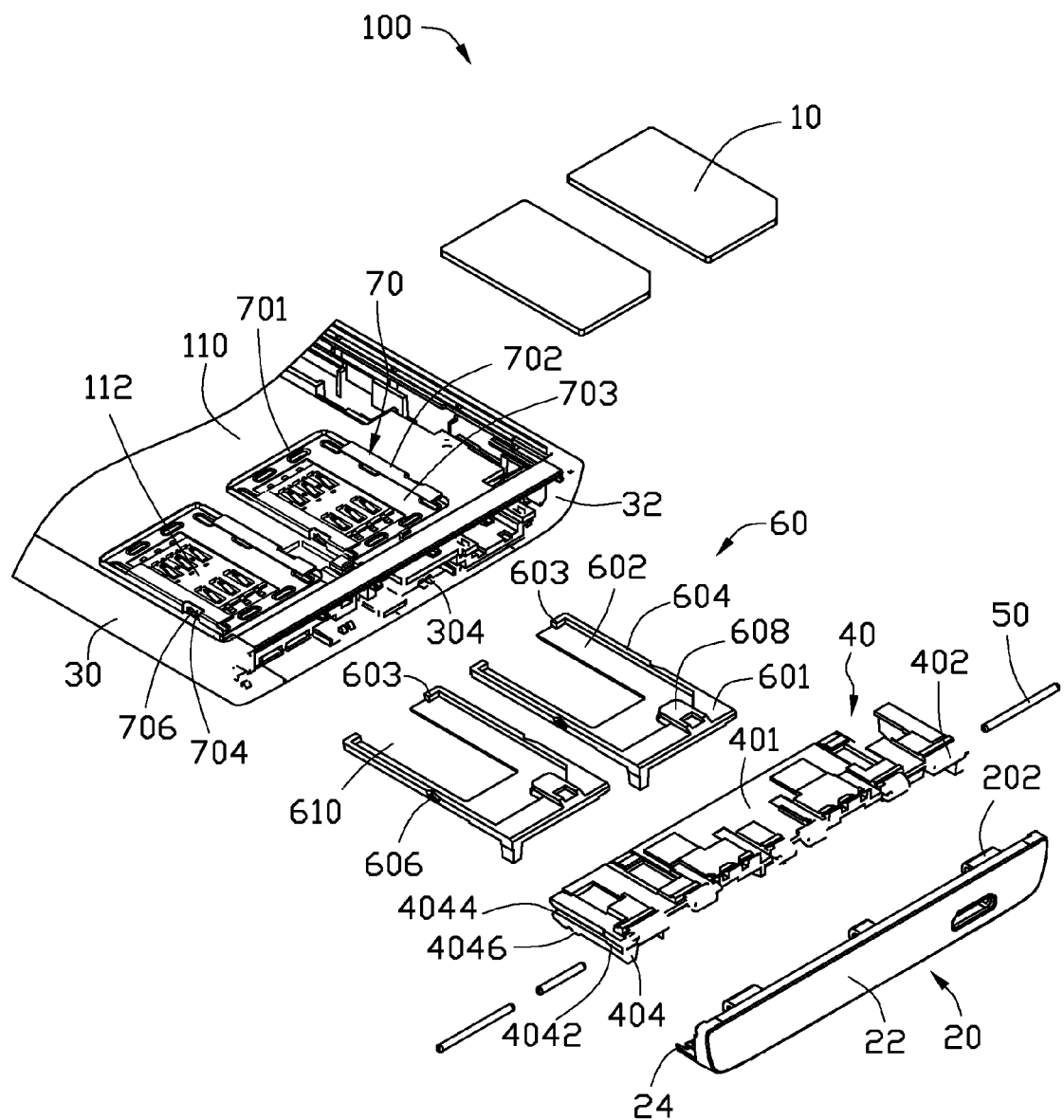
FIG. 2 is an exploded view of one embodiment of the chip card holder.
Figure 3:
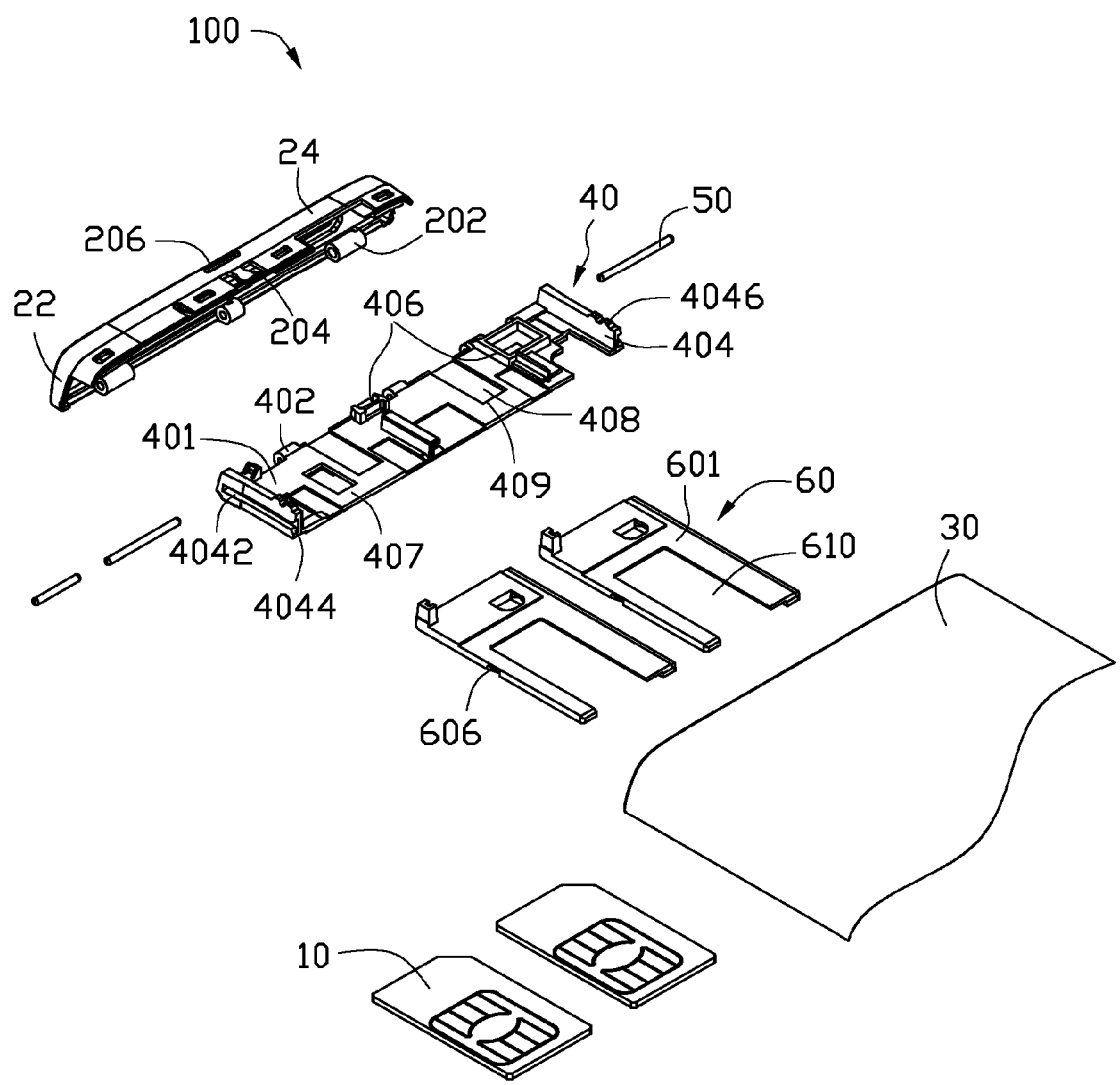
FIG. 3 is similar to FIG. 1, but viewed from anther aspect.

Referring to FIGS. 1 to 3, shown is an exemplary embodiment of a chip card holder which can be used on a portable electronic device 200, such as a cellular phone or any electronic device where a chip card is required. The portable electronic device 200 comprises a housing 30, a chip card holder 100, two chip cards 10, and a printed circuit board (PCB) 110. The chip card holder 100 is assembled to the housing 30. The chip cards 10 can be selectively placed in the chip card holder 100. The chip cards 10 may be subscriber identity module (SIM) cards or flash cards; or one of each. The PCB 110 is fixed to the housing 30.

The chip card holder 100 comprises a protective cover 20, a seat 40, at least one pivotable shaft 50, two trays 60, and two receiving frames 70.

Figure 4:
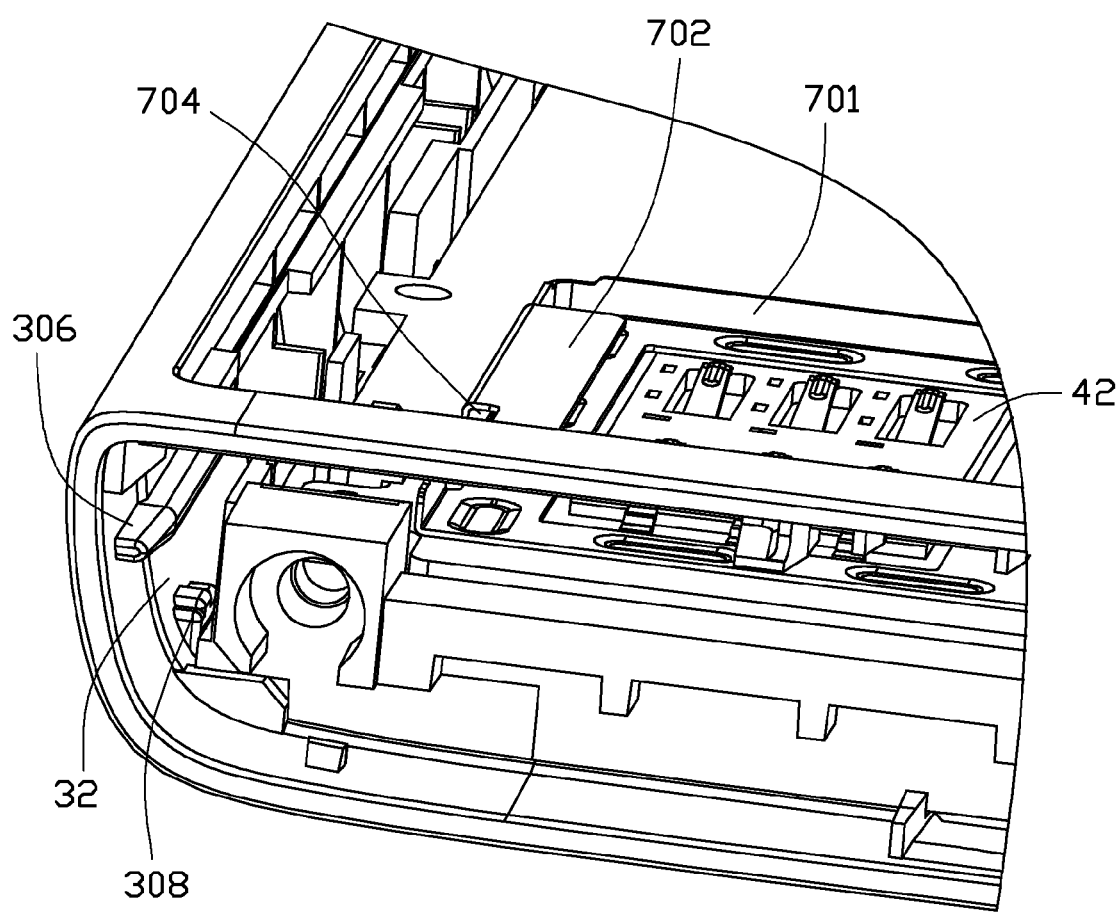
FIG. 4 is an enlarged view of one portion of the housing.

The housing 30 may be a portion of the portable electronic device 200 or a separate element fixed to the portable electronic device 200. In this exemplary embodiment, the housing 30 is a top portion or a bottom portion of the portable electronic device 200. The housing 30 defines an opening 32. The chip cards 10 may be put into the housing 30 through the opening 32. A latching block 304 is located in the housing 30 for latching the protective cover 20. Referring to FIG. 4, the housing 30 comprises opposite rails 306 therein configured for being slidably connected to the seat 40. Two limiting blocks 308 are located in the housing 30 and are respectively adjacent to each rail 306.

The protective cover 20 is configured for covering the opening 32 of the housing 30. The protective cover 20 comprises a first plate portion 22 and a second plate portion 24 being integral with the first plate portion 22. At least one first barrel 202 is located at one end of an inside surface of the first plate portion 22. The second plate portion 24 defines a latching groove 204 for engaging with the latching block 304 to position the protective cover 20 on the housing 30. An operating knob 206 is located between the first plate portion 22 and the second plate portion 24, for conveniently operating the protective cover 20.

The seat 40 is slidably connected to the housing 30 and is rotatably connected to the protective cover 20. One end of the seat 40 has at least one second barrel 402. The shaft 50 is configured for being inserted into the first barrel 202 and the second barrel 402, for rotatably connecting the cover 20 to the seat 40. In this exemplary embodiment, there are three pivotable shafts 50, three first barrels 202 and six second barrels 402. The seat 40 comprises a seat body 401 and opposite extending plates 404 at opposite sides of the seat body 401. A plurality of positioning blocks 406 are formed at one end of the seat body 401, and two receiving spaces 407 are defined on the seat body 401 for receiving the trays 60. A bottom surface of each receiving space 407 defines a guiding groove 408 with an inner wall 409. One end of the guiding groove 408 communicates with one end of the seat 40, and the other end of the guiding groove 408 extends into one part of the seat 40. A longitudinal slot 4042 is defined in each extending plate 404. Each rail 306 of the housing 30 is slidably received in a corresponding slot 4042. Each slot 4042 has an opening end 4044, configured for allowing the rails 306 to slide into the slot 4042. One end of each extending plate 404 has a projection 4046. The projections 4046 can be stopped by the limiting blocks 308 in the housing 30, for preventing the seat 40 from separating from the housing 30.

Each tray 60 is configured for receiving one chip card 10 and is slidably received in a corresponding receiving frame 70. The tray 60 comprises a rectangular plate portion 601, an end edge 603, and two opposite side edges 604. The plate portion 601, the end edge 603, and the two side edges 604 cooperatively define a receiving groove 602, to receive the chip card 10. Each side edge 604 has a groove 606. Each latching portion 706 can be selectively received in a corresponding groove 606 for positioning the tray 60 in the receiving frame 70. A retaining tab 608 is formed on the plate portion 601 used for preventing the chip card 10 from separating from the receiving groove 602. Additionally, when the trays 60 are respectively placed on the receiving spaces 407 of the seat 40, each retaining tab 608 is slid into a corresponding guiding groove 408. When the seat 40 is slid to allow each retaining tab 608 to abut against the inner wall 409 of each guiding groove 408, the seat 40 with the trays 60 moves together. The plate portion 601 defines a notch 610 for allowing chip cards to be electronically connected to the PCB 110.

The two receiving frames 70 are secured on the housing 30 side by side and face the opening 32. Each receiving frame 70 comprises a frame body 701 and two opposite flanges 702, thereby cooperatively defining a cavity 703 communicating with the opening 32 for receiving a corresponding tray 60. Each flange 702 defines a cutout 704 and a latching portion 706, exposed from the cutout 704. To mount the receiving frames 70 on the housing 30, the frame body 701 may be adhered or welded on the PCB 110. Connectors 112 on the PCB 110 are received in each frame body 701. When each tray 60 is received in a corresponding receiving frame 70, the chip card 10 can be electronically connected to the connector 112 in the receiving frame 70 through the notch 610.

Figure 5:
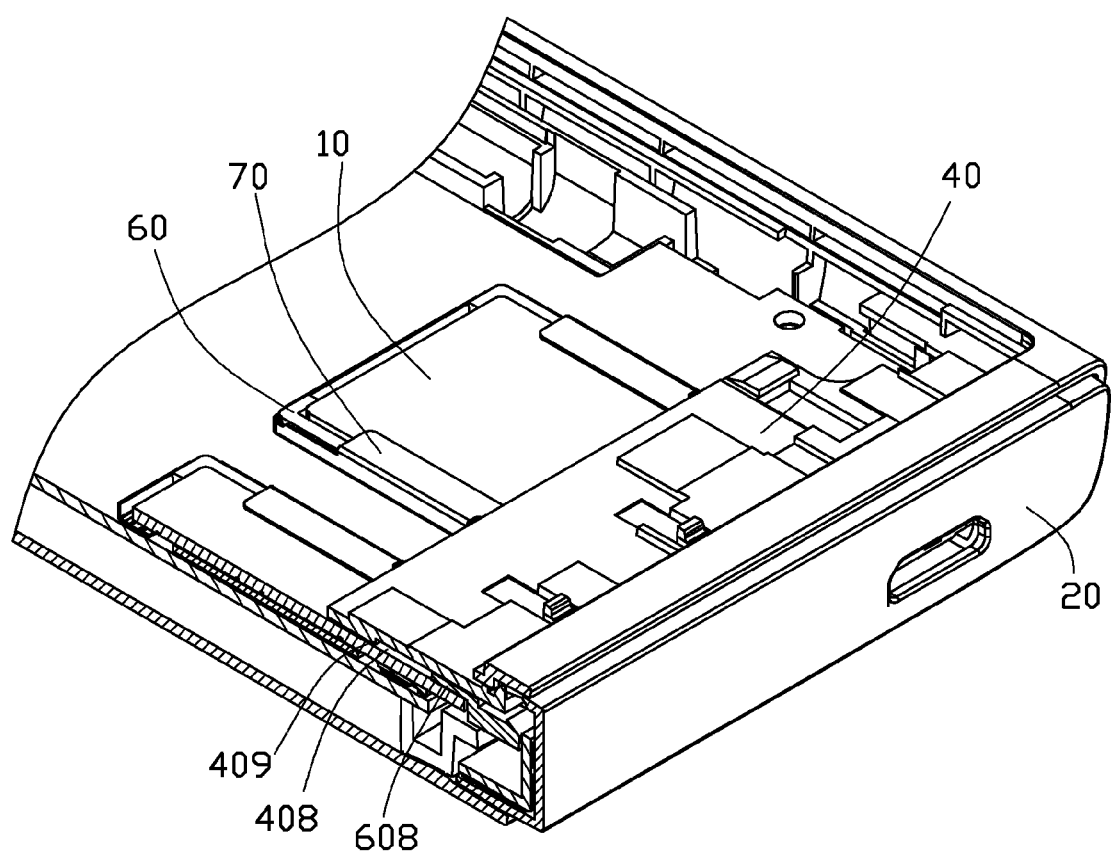
FIG. 5 is an assembled view of the chip card holder, showing a protective cover in a closed state.
Figure 6:
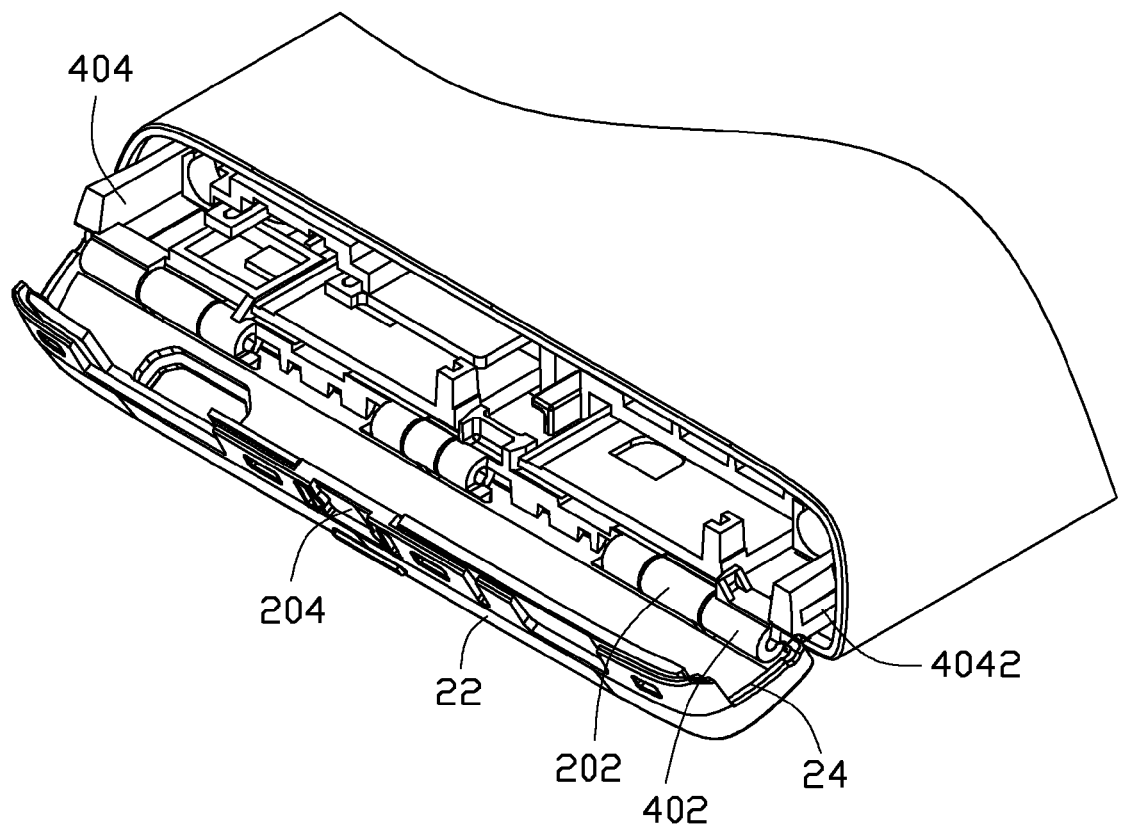
FIG. 6 is similar to FIG. 5, but showing the protective cover in an open state.
Figure 7:
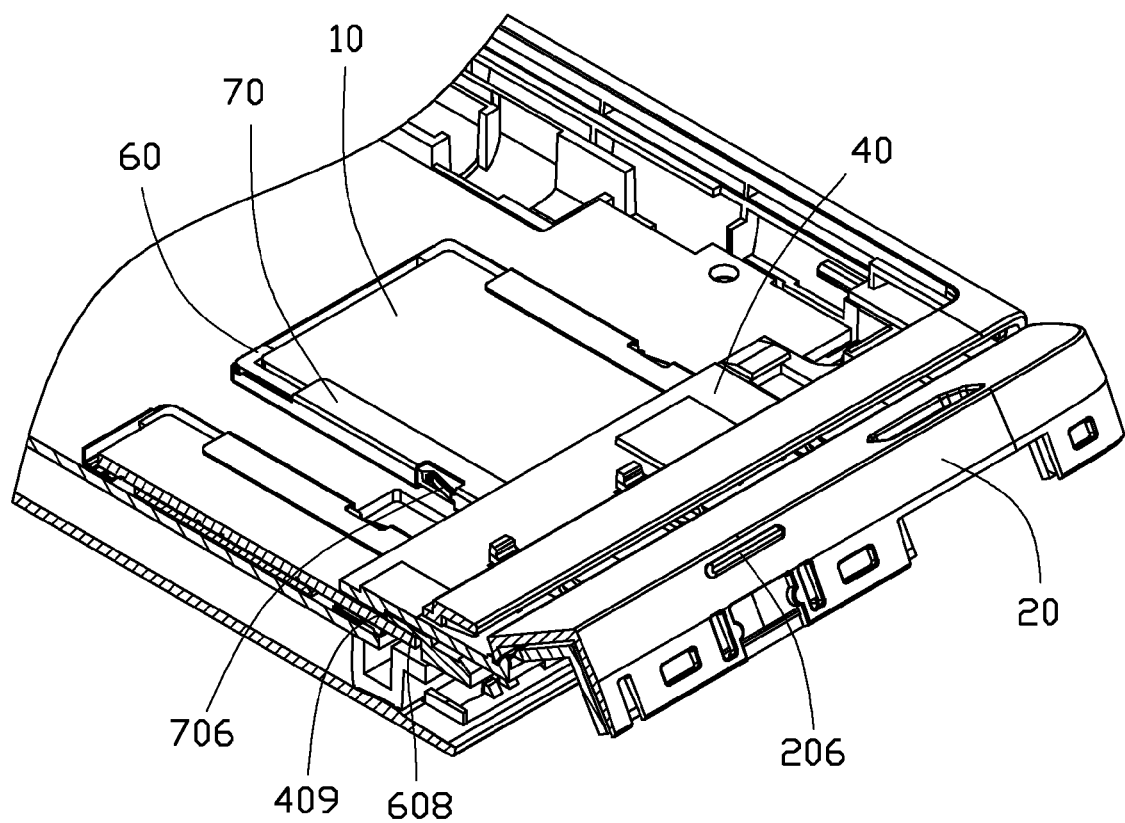
FIG. 7 is similar to FIG. 6, but shown from another aspect.

During assembly, referring to FIGS. 5-7, the protective cover 20 is rotatably connected to the seat 40 by the three shafts 50. Then, the seat 40 with the protective cover 20 is slidably connected to the housing 30 through the opening 32. The rails 306 of the housing 30 are slid into the slots 4042 of the seat 40 from the opening ends 4044 of the slots 4042. Each chip card 10 is assembled in the receiving groove 602 of each tray 60. The seat 40 with the protective cover 20 is pulled to be extended from the opening 32. The trays 60 are inverted with the cards 10 placed face down on the seat 40. The positioning blocks 406 are used for limiting each tray 60 to move toward the two sides thereof. The retaining tabs 608 of the trays are aligned with the guiding grooves 48 on the seat 40. The trays 60 are pushed to slide on the seat 40 to allow each retaining tab 608 of the trays 60 to slide into a corresponding guiding groove 408. When the retaining tabs 608 are slid to abut against the inner walls 409 of the guiding grooves 408, the trays 60 with the seat 40 together are moved toward the receiving frames 70 until the trays 60 are received in the cavities 703. The latching portions 706 are latched in the positioning grooves 606. Thus, the trays 60 are positioned in the receiving frames 70. The protective cover 20 is rotated to cover the opening 32. Thus, the assembly process of the chip card holder 100 is finished. Referring to FIG. 5, the first barrels 202 and the second barrels 402 are completely hidden by the protective cover 20. Thus, the first barrels 202 and the second barrels 402 will not affect the appearance of the portable electronic device.

To remove the chip cards 10, the protective cover 20 is pulled to move the seat 40 to extend from the opening 32. Referring to FIGS. 6 and 7, when the seat 40 is pulled to allow the first barrels 202 and the second barrels 404 to be exposed from the opening 32, the protective cover 20 is rotated about the pivotable shafts 50 to avoid the trays 60 from blocking. Then, the seat 40 is further pulled to extend from the opening 32 until the retaining tabs 608 are slid to abut against the inner walls 409 of the guiding grooves 408. The trays 60 with the seat 40 together are further pulled to extend from the opening 32. Accordingly, the trays 60 are slid out of the receiving frames 70. Thus, the chip cards 10 can then be easily removed from the trays 60.

As described above, the exemplary embodiment provides a chip card holder for portable electronic devices, such as mobile phones. The chip card holder can be easily opened, and the protective cover can effectively protect the trays 60.

Although numerous characteristics and advantages of the exemplary disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A chip card holder comprising:
    a housing defining an opening;
    a printed circuit board received in the housing;
    a seat slidably received in the housing and defining a guiding groove with an inner wall;
    a pivotable shaft;
    a protective cover rotatably connected to the seat by the pivotable shaft and is configured for covering the opening;
    a receiving frame mounted on the printed circuit board; and
    a tray positioned face down on the seat and forms a retaining tab;
    wherein the protective cover is pulled to move the seat to extend from the opening until the retaining tab is slid to abut against the inner wall of the guiding groove, and the seat and the tray are pulled together to slide out of the opening.

2. The chip card holder of claim 1, wherein the housing comprises opposite rails; the seat comprises a seat body and opposite extending plates, located at opposite sides of the seat body, and a longitudinal slot is defined in each extending plate; and the rails of the housing are slidably received in the slots.

3. The chip card holder of claim 2, wherein one end of each extending plate has a projection; a limiting block is located in one side of the housing and adjacent to each rail; and the projections are stopped by the limiting blocks in the housing for preventing the seat from separating from the housing.

4. The chip card holder of claim 1, wherein the protective cover comprises a first plate portion and a second plate portion, wherein the first plate and the second plate are integral; and at least one first barrel is located at one end of an inside surface of the first plate portion, one end of the seat has at least one second barrel, and the pivotable shaft is inserted into the first barrel and the second barrel for rotatably connecting the protective cover to the seat, and the at least one first barrel and the at least one second barrel are hidden by the protective cover.

5. The chip card holder of claim 1, wherein the tray comprises a rectangular plate portion, an end edge, and two opposite side edges; and the rectangular plate portion, the end edge, and the two side edges cooperatively define a receiving groove, to receive a chip card.

6. The chip card holder of claim 5, wherein each side edge has a positioning groove, each receiving frame comprises a frame body and two opposite edges, each of the two opposite edges defines a cutout and a latching portion exposed from the cutout, and the latching portion is latched in the positioning groove.

7. The chip card holder of claim 5, wherein the retaining tab is located on the rectangular plate portion.

8. A portable electronic device, comprising:
    a housing defining an opening;
    a printed circuit board received in the housing; and
    a chip card holder, the chip card holder comprising:
        a seat slidably received in the housing and defining a guiding groove with an inner wall;
        at least one pivotable shaft;
        a protective cover rotatably connected to the seat by the at least one pivotable shaft and is configured for covering the opening
        two receiving frames mounted on the printed circuit board; and
        two trays positioned face down on the seat, each tray forms a retaining tab;

wherein the protective cover is pulled to move the seat to extend from the opening until the retaining tabs are slid to abut against the inner wall of the guiding groove, and the seat and the trays are pulled together to slide out of the opening.

9. The portable electronic device of claim 8, wherein the protective cover comprises a first plate portion and a second plate portion, wherein the first plate and the second plate are integral; at least one first barrel is formed at one end of an inside surface of the first plate portion, one end of the seat has at least one second barrel; the pivotable shaft is inserted into the first barrel and the second barrel for rotatably connecting the protective cover to the seat, and the at least one first barrel and the at least one second barrel are hidden by the protective cover.

10. The portable electronic device of claim 8, wherein each tray comprises a rectangular plate portion, an end edge, and two opposite side edges, the rectangular plate portion, the end edge and the two side edges cooperatively define a receiving groove to receive a chip card.

11. The portable electronic device of claim 10, wherein each side edge has a positioning groove, each receiving frame comprises a frame body and two opposite edges, each of the two opposite edges defines a cutout and a latching portion exposed from the cutout, and the latching portion is latched in the positioning groove.

12. The portable electronic device of claim 10, wherein the retaining tab is located on the rectangular plate portion of each tray.

13. A chip card holder comprising:

a housing defining an opening;

a printed circuit board received in the housing;

a protective cover comprising a plurality of first barrels;

a seat slidably received in the housing, the seat comprising a plurality of second barrels and defining a guiding groove with an inner wall;

at least one pivotable shaft inserted into the first barrels and the second barrels for rotatably connecting the protective cover to the seat;

a tray positioned face down on the seat and forms a retaining tab; and a receiving frame mounted on the printed circuit board, the tray slidably received in the receiving frame;

wherein when in a closed state, the seat and the tray are received in the housing, the protective cover covers the opening and the first barrels and the second barrels are hidden by the protective cover;

wherein the protective cover is pulled from the closed state to extend the seat from the opening and is rotated about the at least pivotable shaft until the retaining tab is slid to abut against the inner wall of the guiding groove, the seat moves the tray and the tray slides relative to the receiving frame to allow the tray to be exposed from the opening.

* * * * *